UNITED STATES PATENT OFFICE.

GEORGE ARTHUR LA VALLEE, OF MARIETTA, OHIO, ASSIGNOR TO THE NORTHWESTERN CHEMICAL COMPANY, OF MARIETTA, OHIO.

COMPOSITION FOR STOPPING LEAKS.

953,626.  Specification of Letters Patent.  Patented Mar. 29, 1910.

No Drawing.  Application filed November 24, 1909. Serial No. 529,825.

*To all whom it may concern:*

Be it known that I, GEORGE A. LA VALLEE, a citizen of the United States, residing at Marietta, in the county of Washington, State of Ohio, have invented certain new and useful Improvements in Compositions for Stopping Leaks, of which the following is a description.

My invention relates to a new compound or composition of matter designed to be used for the purpose of stopping leaks in the water jacket, radiator, or connecting piping provided for the purpose of cooling the engines of internal combustion engine driven automobiles, which leaks frequently result from defective joints in some part of the cooling system, or from the joints becoming loose in use, or result accidentally from the freezing of the water in the cooling system in case the system is not properly drained in cold weather.

My composition of matter comprises the ingredients enumerated below; and I have obtained the best results by using the various ingredients in about the proportion indicated by the figures placed opposite each ingredient, although I have found that the proportion of the several ingredients may be varied to a considerable degree without materially detracting from the efficiency of the composition:

| | | |
|---|---|---|
| Sodium borate | 5 | parts |
| Sugar | 4 | " |
| Dextrin | 15 | " |
| Ground flax seed | 75 | " |
| Total | 99 | parts, | to which I prefer to add one part of a suitable coloring matter, such as anilin.

The above mentioned ingredients are intimately mixed and form a powder, which, when used, is added to the water in the cooling system, and is readily dissolved thereby. The water thus holds the compound in solution and, as the water continues to leak slowly through the imperfect joint, the water upon reaching the atmosphere evaporates quickly and leaves a film of my composition adjacent the leak. The film of composition thus produced hardens rapidly because of the high temperature of the various parts comprising the cooling system, and, as the water continues to ooze through the defective joint or leak more of the composition accumulates and hardens, thus gradually but presently stopping the flow of water through the defective joint.

The composition after solution, evaporation, and hardening as above possesses the properties of a tough and elastic cement which fills the passages or cracks through which the water has been leaking, and a cement which, moreover, adheres to the metal of the cooling system with great tenacity, and a cement which is not disturbed or broken by the vibrations commonly present in automobile vehicles.

The action of the various ingredients upon one another in stopping a leak is, according to my understanding, as follows, although it is not asserted that other or different peculiarities of action may not be present: The sodium borate softens the water in which the compound is dissolved and saponifies the oil liberated from the flax seed by the action of the heated water within the cooling system, and the resulting product as it reaches the atmosphere and the water is evaporated is arrested and held at the leak by the sugar and dextrin which act as binders for the saponified oil, the whole forming a tough and elastic and a hard cement at the point where evaporation of the water takes place as above explained. The anilin is used for coloring the composition and may be omitted.

Having thus disclosed my composition of matter and explained its use, I claim and desire to secure by Letters Patent:—

1. The herein disclosed composition of matter composed of sodium borate, sugar, dextrin, and flax seed.

2. The herein disclosed composition of matter composed of sodium borate five parts, sugar four parts, dextrin fifteen parts, and flax seed seventy-five parts.

This specification signed and witnessed this third, (3rd) day of November A. D. 1909.

GEORGE ARTHUR LA VALLEE.

In the presence of—
 JAS. H. DYE,
 C. H. FERD.